US007696858B2

(12) United States Patent
Groff

(10) Patent No.: US 7,696,858 B2
(45) Date of Patent: Apr. 13, 2010

(54) REMOTELY OPERABLE DOOR LOCK INTERFACE SYSTEM

(76) Inventor: John K. Groff, 24 Westminster #7, Boston, MA (US) 02115

( * ) Notice: Subject to any disclaimer, the term of this patent is extended or adjusted under 35 U.S.C. 154(b) by 908 days.

(21) Appl. No.: 11/487,086

(22) Filed: Jul. 17, 2006

(65) Prior Publication Data

US 2008/0011032 A1 Jan. 17, 2008

(51) Int. Cl.
*H04B 1/38* (2006.01)

(52) U.S. Cl. ........................ 340/5.61; 340/5.6; 340/5.7; 70/101; 70/128

(58) Field of Classification Search ................ 340/5.61, 340/5.62, 542, 545.1, 545.7, 5.2, 5.1–5.92; 70/279.1, 278.2, 278.6; 292/144; 320/107, 320/108

See application file for complete search history.

(56) References Cited

U.S. PATENT DOCUMENTS 5,531,086 A * 7/1996 Bryant ...................... 70/279.1
5,693,987 A * 12/1997 Krucoff ..................... 307/10.2
5,790,034 A 8/1998 Khoury
D401,565 S 11/1998 Smith et al.
5,933,086 A * 8/1999 Tischendorf et al. ....... 340/5.22
5,943,888 A * 8/1999 Lawson ..................... 70/278.7
6,035,676 A * 3/2000 Hudspeth .................. 70/278.1
6,185,773 B1 2/2001 Goedde
6,244,084 B1 6/2001 Warmack
6,666,054 B1 12/2003 Hsieh
6,739,164 B2 5/2004 Warmack
6,865,916 B2 3/2005 Goldman
2004/0089037 A1* 5/2004 Chang ......................... 70/257
2004/0135541 A1* 7/2004 Cho et al. ................... 320/107
2004/0220798 A1* 11/2004 Chi et al. .................... 704/201

* cited by examiner

*Primary Examiner*—Daniel Wu
*Assistant Examiner*—Ryan W Sherwin

(57) ABSTRACT

A door lock interface system includes a stationary controller that is mounted to a support surface at an interior of a building. A portable controller is in wireless communication with the stationary controller. An elongated and rectilinear bolt is positioned through a slot of a door and is spaced from the stationary and portable controllers. A mechanism is included for automatically retracting and extending the bolt along a parallel and horizontal path. A mechanism is included for bypassing the automatic retracting and extending mechanism such that the user can manually retract and extend the bolt. A security panel is affixed to one side of the door and covers one door cavity, prohibiting unauthorized access thereto. The security panel is provided with annular openings, allowing a door handle and a deadbolt housing to be connected to the door while maintaining the automatic extending and retracting mechanism hidden from the environment.

17 Claims, 9 Drawing Sheets

REMOTELY OPERABLE DOOR LOCK INTERFACE SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to remotely operable locking systems and, more particularly, to a remotely operable door lock interface system.

2. Prior Art

Over the years, incidents relating to home burglaries and theft have steadily increased. This increase has concerned the consumer and these concerns have lead them to invest in more elaborate home safety devices, including the use of dead bolts, burglar alarms, a combination thereof, or the like. Though these devices are known to work successfully, they may not offer the protection needed for some consumers. For example, some consumers do not have their keys ready for insertion into the lock and many find themselves searching through their belongings in hopes of finding their keys quickly. Such a pause in opening the door is a perfect invitation to a thief, robber or the like for jumping, attacking, harming or robbing the individual. In other situations, someone may have their hands full of groceries, a child, or the like. This causes their hands to be occupied and unavailable to quickly and efficiently unlock the door, which is a typical, yet potentially dangerous, scenario.

As such, devices have been developed to assist the consumer and to inherently decrease the time needed to enter a home. One such device is a keyless entry dead bolt lock system that includes an actuator, which is coupled to a conventional dead bolt mechanism via a connection rod. Though this design will allow for the dead bolt to operate from a remote control unit, it suffers some shortcomings. One such shortcoming is that this prior art configuration requires the device to extend horizontally across the door. The horizontal displacement can be obtrusive and bulky, thereby producing a product, which is not aesthetically pleasing, something undesirable by many consumers. In addition, the design and configuration of the connecting rod to the conventional dead bolt and actuator is such that after extended use, it may dislodge therefrom. The dislodgment will defeat its intended purpose. Further still, this system is solely utilized for dead bolts and does not address other locking systems typically used in a home, office or the like.

Accordingly, a need remains for a remotely operable door lock interface system in order to overcome the above-noted shortcomings. The present invention satisfies such a need by providing a remotely operable door lock system that is easy to install and use, is compact in design, provides convenience and time savings, and has the ability to provide an increased level of safety in a home or business establishment. Such a system advantageously eliminates the need to search for one's key in order to open a locked door, thus reducing the amount of time needed to enter a locked residence or business. A do-it-yourself enthusiast finds the installation of this system quite easy, since the system is virtually similar to installing a conventional lock or deadbolt assembly.

BRIEF SUMMARY OF THE INVENTION

In view of the foregoing background, it is therefore an object of the present invention to provide a remotely operable door lock interface system. These and other objects, features, and advantages of the invention are provided by a door lock interface system for allowing a user to remotely lock and unlock a door having a pair of cavities.

The door lock interface system includes a stationary controller. Such a stationary controller is mounted to a support surface located at an interior of a building that houses the door. The stationary controller may include a transceiver, an analog to digital converter, a processor, and a memory including software instructions that cause the stationary controller to decode the coded input and output signals respectively for verifying an authorized user. The software instructions include the steps of detecting an identification data stream embedded within the coded input and output signals, comparing the identification data stream with an authorization data stream, and instructing the stationary controller to perform predetermined tasks associated with verified and unverified identification data streams. One of the predetermined tasks emits audible and visual alert signals when the identification data stream is unverified.

A portable controller is in wireless communication with the stationary controller. Such a portable controller preferably includes a transceiver, an analog to digital converter, a processor, and a memory including software instructions that cause the portable controller to decode the coded input and output signals respectively for verifying an authorized user. The software instructions include the steps of detecting an identification data stream embedded within the coded input and output signals, comparing the identification data stream with an authorization data stream, and instructing the portable controller to perform predetermined tasks associated with verified and unverified identification data streams. One of the predetermined tasks emits audible and visual alert signals when the identification data stream is unverified. The portable controller preferably further includes a base station that is electrically coupled to an external power source. Such a base station includes a first charging bay for receiving the portable controller thereon. A second charging bay is included for conveniently and effectively receiving a plurality of rechargeable batteries.

An elongated and rectilinear bolt is positioned through a slot of a door. Such a bolt is spaced from the stationary and portable controllers. A mechanism is included for automatically retracting and extending the bolt along a parallel and horizontal path such that the bolt becomes adapted between disengaged and engaged positions when unlocking and locking the door. Such an automatic retracting and extending mechanism preferably includes a stop member that is directly conjoined to an interior distal end of the bolt and is seated between opposed faces of the door.

An elongated and rectilinear rod is statically conjoined directly to the stop member and extends horizontally inwardly away from a jam side of the door. Such a rod has a serrated distal end oppositely facing the bolt, wherein the serrated distal end faces downwardly. A drive gear has a toothed outer surface interlocked with the serrated distal end such that the rod linearly travels along the horizontal path when the drive gear rotates clockwise and counterclockwise respectively. An electric motor and a drive shaft are directly conjoined thereto. Such a drive shaft is directly coupled to the drive gear and is responsive to the stationary and portable controllers respectively for effectively causing the drive gear to rotate in the clockwise and counter clockwise directions.

The automatic extending and retracting mechanism may further include an internal controller that is electrically coupled to the motor. The internal controller preferably includes a transceiver, an analog to digital converter, a processor, and a memory including software instructions that cause the internal controller to decode the coded input and output signals respectively for verifying an authorized user. The software instructions include the steps of detecting an identification data stream embedded within the coded input and output signals, comparing the identification data stream with an authorization data stream, and instructing the internal controller to perform predetermined tasks associated with verified and unverified identification data streams. One of the predetermined tasks emits audible and visual alert signals when the identification data stream is unverified.

A coded input signal is generated and transmitted by the portable controller based upon a user input. A coded output signal is generated and transmitted by the stationary controller based upon instructions received from the coded input signal. Such a coded output signal is wirelessly transmitted to the internal controller for conveniently and effectively instructing the electric motor to rotate in the clockwise and counter clockwise directions during operating conditions.

A mechanism is included for bypassing the automatic retracting and extending mechanism such that the user can manually retract and extend the bolt when unlocking and locking the door respectively. Such a bypassing mechanism preferably includes a keyed slot formed directly through the stop member. A key is associated with the keyed slot so that a user can manually extend and retract the shaft about the drive gear to thereby effectively cause the bolt to extend and retract along the horizontal path and adapt the door between locked and unlocked positions.

A security panel is directly affixed to one side of the door. Such a panel covers one of the door cavities and effectively prohibits unauthorized access thereto. The security panel is provided with a plurality of coextensively shaped annular openings for advantageously allowing a door handle and a deadbolt housing to be operably connected directly to the door while conveniently maintaining the automatic extending and retracting mechanism hidden from the environment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
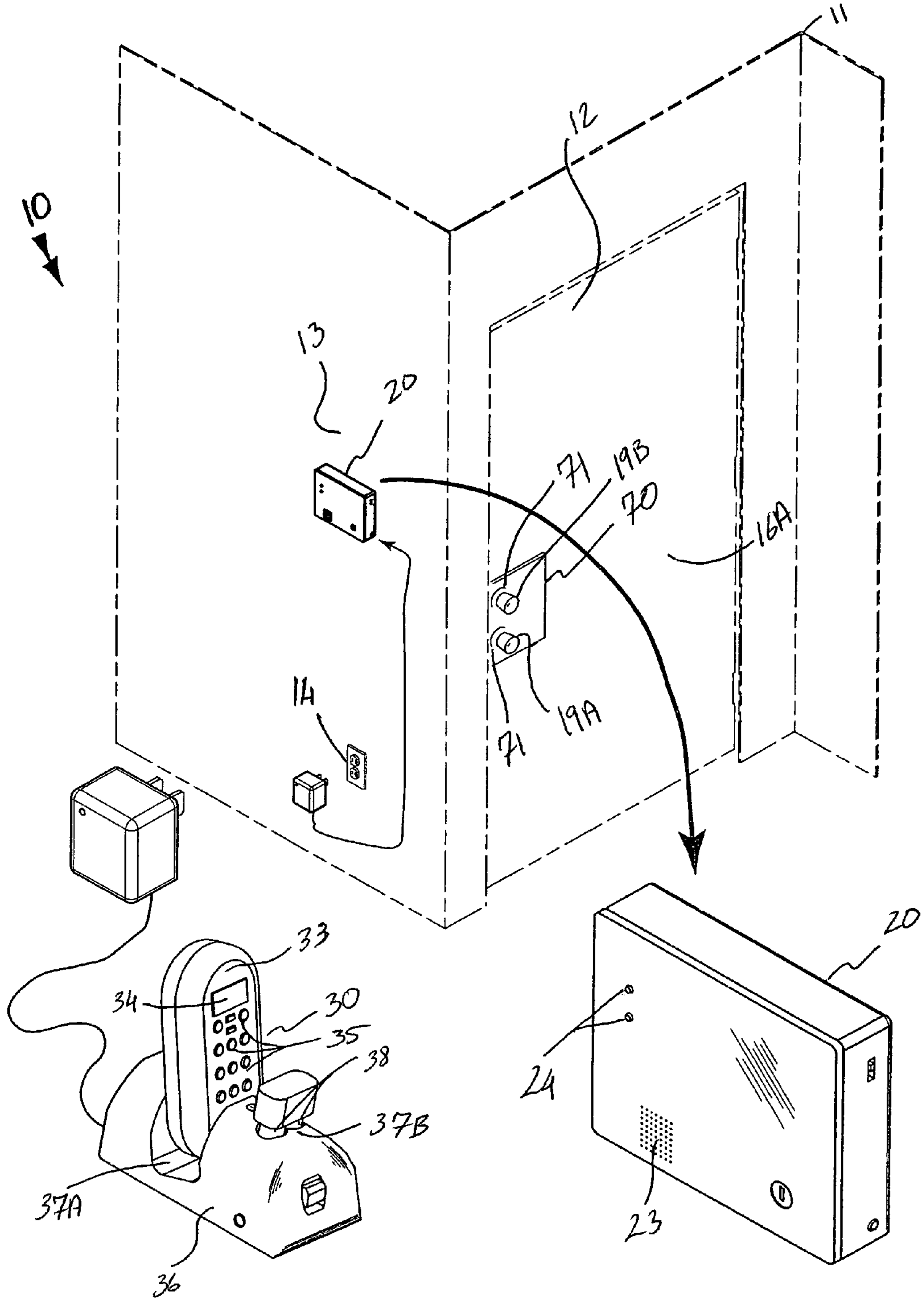
FIG. 1 is a perspective view showing a remotely operable door lock interface system, in accordance with the present invention.
Figure 2:
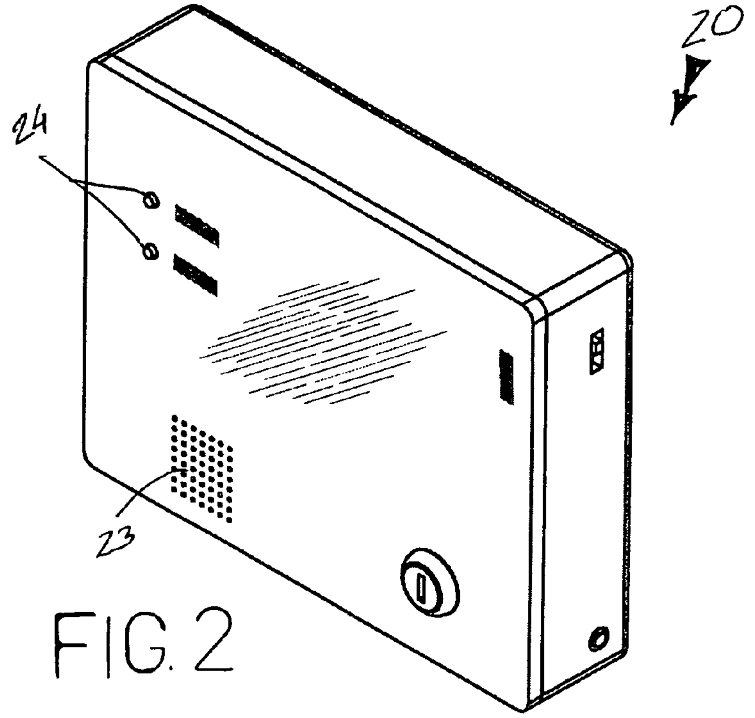
FIG. 2 is an enlarged perspective view of the stationary controller shown in FIG. 1.
Figure 3:
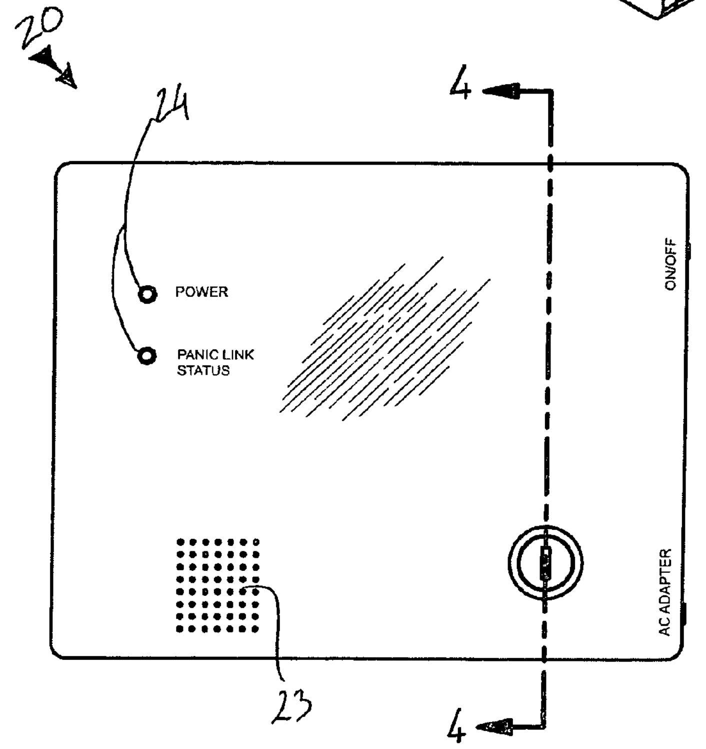
FIG. 3 is front-elevational view of the stationary controller shown in FIG. 2.
Figure 4:
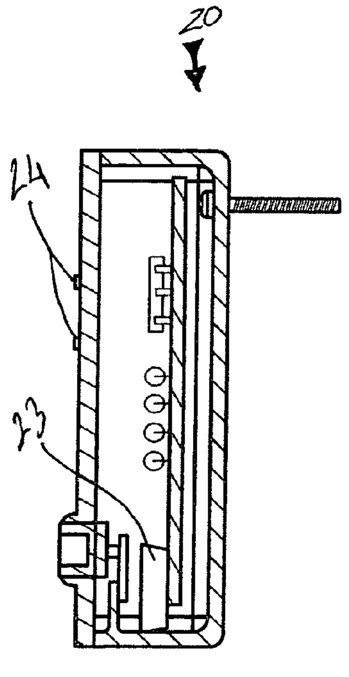
FIG. 4 is a cross-sectional view of the stationary controller shown in FIG. 3, taken along line 4-4.
Figure 5:
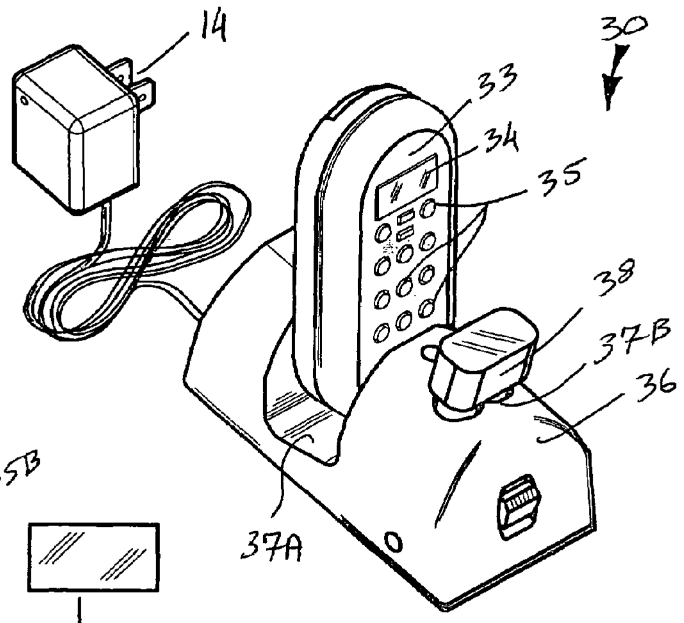
FIG. 5 is an enlarged perspective view of the base station shown in FIG. 1, showing the portable controller and the rechargeable batteries within their respective charging bays.
Figure 8:
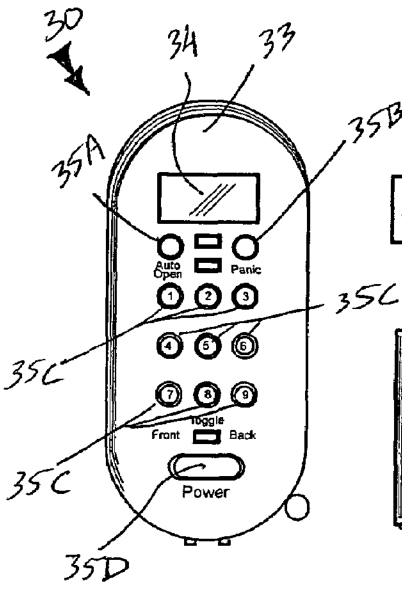
FIG. 8 is a front-elevational view of the portable controller and the rechargeable batteries shown in FIG. 5.
Figure 8:
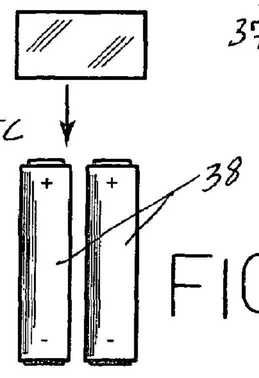
Figure 6:
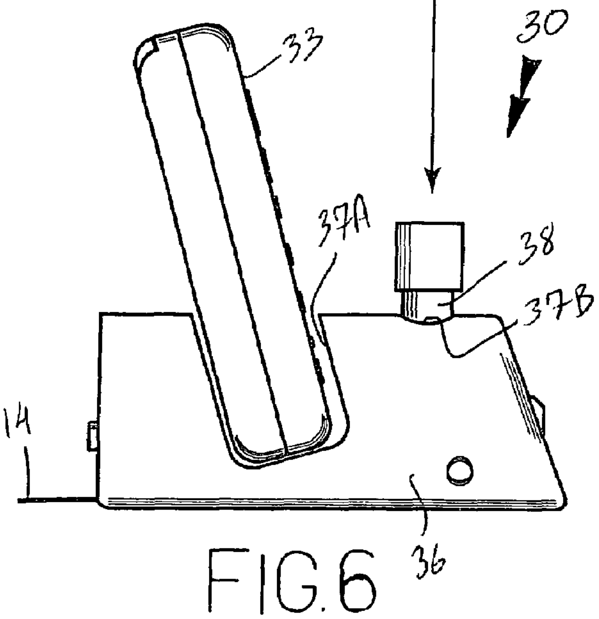
FIG. 6 is a side-elevational view of the base station shown in FIG. 5.
Figure 7:
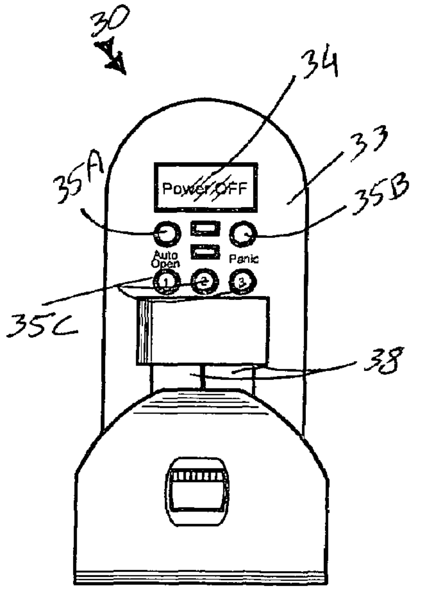
FIG. 7 is a front-elevational view of the base station shown in FIG. 5.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-19 by the reference numeral 10 and is intended to provide a remotely operable door lock interface system. It should be understood that the system 10 may be used to remotely operate many different types of locks and should not be limited in use to only deadbolt door locks.

Referring initially to FIGS. 1, 2, 3, 4 and 19, the system 10 includes a stationary controller 20. Such a stationary controller 20 is mounted to a support surface 13 located at an interior of a building 11 that houses the door 12. The stationary controller 20 includes a transceiver 21, a processor 22, a speaker 23, a plurality of LED's 24, and a memory 25 including software instructions that cause the stationary controller 20 to decode the coded input signal 39 (described herein below) for verifying an authorized user.

Figure 19:
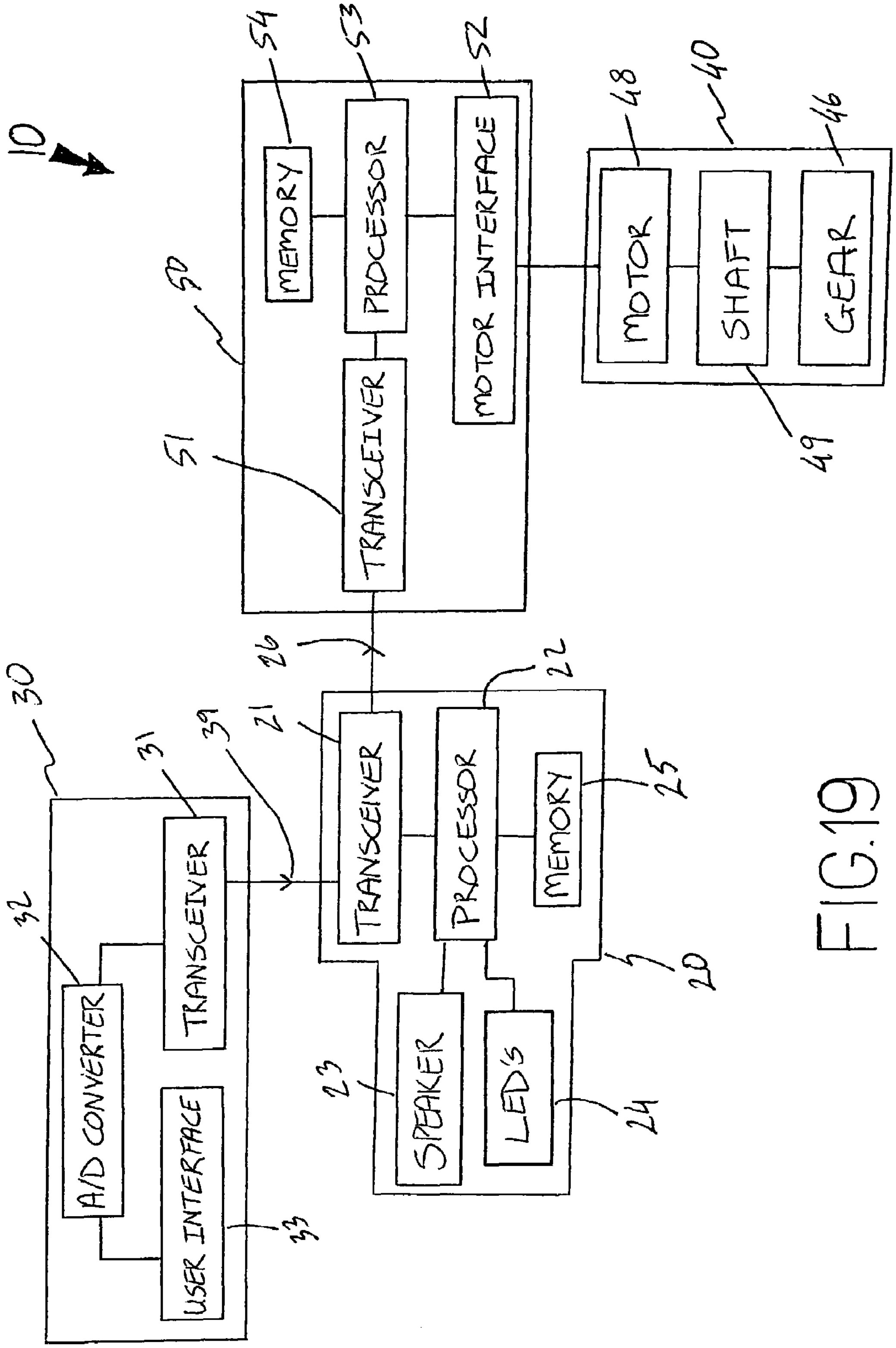
FIG. 19 is a schematic block diagram of the system shown in FIG. 1.

Referring to FIG. 19, the software instructions include the steps of detecting an identification data stream embedded within the coded input signal 39, comparing the identification data stream with an authorization data stream, and instructing the stationary controller 20 to perform predetermined tasks associated with verified and unverified identification data streams. One of the predetermined tasks emits audible and visual alert signals by means of the speaker 23 and LED's 24, respectively, when the identification data stream is unverified.

A coded output signal 26 is generated and transmitted by the stationary controller 20 based upon instructions received from the coded input signal 39. Such a coded output signal 26 is wirelessly transmitted to the internal controller 50 (described herein below), which is crucial for conveniently and effectively instructing the electric motor 48 (described herein below) to rotate in the clockwise and counter clockwise directions during operating conditions.

Referring to FIGS. 1, 5, 6, 7, 8, 18 and 19, a portable controller 30 is in wireless communication with the stationary controller 20. Such a portable controller 30 includes a transceiver 31, an analog to digital converter 32, and a user interface 33. The user interface consists of a display screen 34 and a plurality of control buttons 35. Such control buttons 35 includes an AUTO OPEN button 35A to activate the system 10, a PANIC button 35B for alerting the authorities in case of an emergency, various NUMERIC buttons 35C for entering a personal identification code, and a POWER button 35D for toggling the portable controller 30 between operating and non-operating modes.

Referring to FIGS. 1, 5, 6, 7 and 8, the portable controller 30 further includes a base station 36 that is electrically coupled to an external power source 14. Such a base station 36 includes a first charging bay 37A that is important for receiving the portable controller 30 thereon. A second charging bay 37B is included and is vital for conveniently and effectively receiving a plurality of rechargeable batteries 38 therein. A coded input signal 39 is effectively generated and transmitted by the portable controller 30 based upon a user input.

Referring to FIGS. 9, 10, 11, 12, 13, 14, 15, 16, 17 and 19, an elongated and rectilinear bolt 41 is positioned through a slot 15 of a door 12. Such a bolt 41 is spaced from the stationary 20 and portable 30 controllers. A mechanism 40 is included for automatically retracting and extending the bolt 41 along a parallel and horizontal path, which is essential and convenient such that the bolt 41 becomes adapted between disengaged and engaged positions when unlocking and locking the door 12. Such an automatic retracting and extending mechanism 40 includes a stop member 42 that is directly conjoined, without the use of intervening elements, to an interior distal end 43 of the bolt 41 and is seated between opposed faces 16 of the door 12.

An elongated and rectilinear rod 44 is statically conjoined directly, without the use of intervening elements, to the stop member 42 and extends horizontally inwardly away from a jam side 17 of the door 12. Such a rod 44 has a serrated distal end 45 oppositely facing the bolt 41, wherein the serrated distal end 45 faces downwardly. A drive gear 46 has a toothed outer surface 47 interlocked with the serrated distal end 45, which is important such that the rod 44 linearly travels along the horizontal path when the drive gear 46 rotates clockwise and counterclockwise respectively. An electric motor 48 and a drive shaft 49 are directly conjoined, without the use of intervening elements, thereto. Such a drive shaft 49 is directly coupled, without the use of intervening elements, to the drive gear 46 and is responsive to the stationary 20 and portable 30 controllers respectively for effectively causing the drive gear 46 to rotate in the clockwise and counter clockwise directions.

Referring to FIG. 19, the automatic extending and retracting mechanism 40 further includes an internal controller 50 that is electrically coupled to the motor 48. Such an internal controller 50 includes a transceiver 51, a motor interface 52, a processor 53, and a memory 54 including software instructions that cause the internal controller 50 to decode the coded output signal 26 for verifying an authorized user. The software instructions include the steps of detecting an identification data stream embedded within the coded output signal 26, comparing the identification data stream with an authorization data stream, and instructing the internal controller 50 to perform predetermined tasks associated with verified and unverified identification data streams.

Referring to FIGS. 9, 10, 11, 13 and 17, a mechanism 60 is included for bypassing the automatic retracting and extending mechanism 40, which is crucial and advantageous such that the user can manually retract and extend the bolt 41 when unlocking and locking the door 12 respectively. Such a bypassing mechanism 60 includes a keyed slot 61 formed directly through the stop member 42. A key 62 is associated with the keyed slot 61 so that a user can manually extend and retract the shaft 49 about the drive gear 46 to thereby effectively cause the bolt 41 to extend and retract along the horizontal path and adapt the door 12 between locked and unlocked positions.

Figure 9:
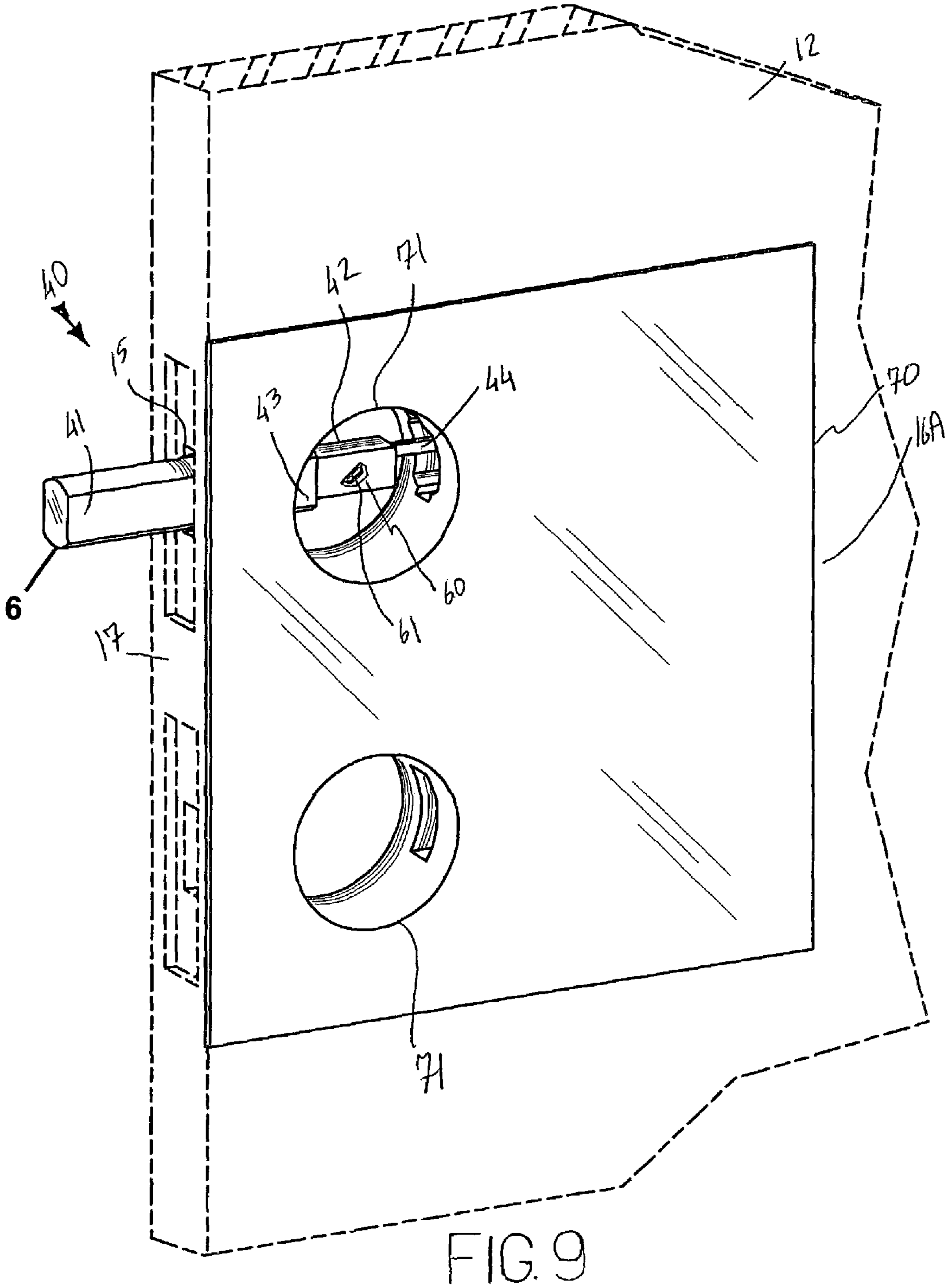
FIG. 9 is a perspective view showing the elongated and rectilinear bolt, in accordance with the present invention.
Figure 10:
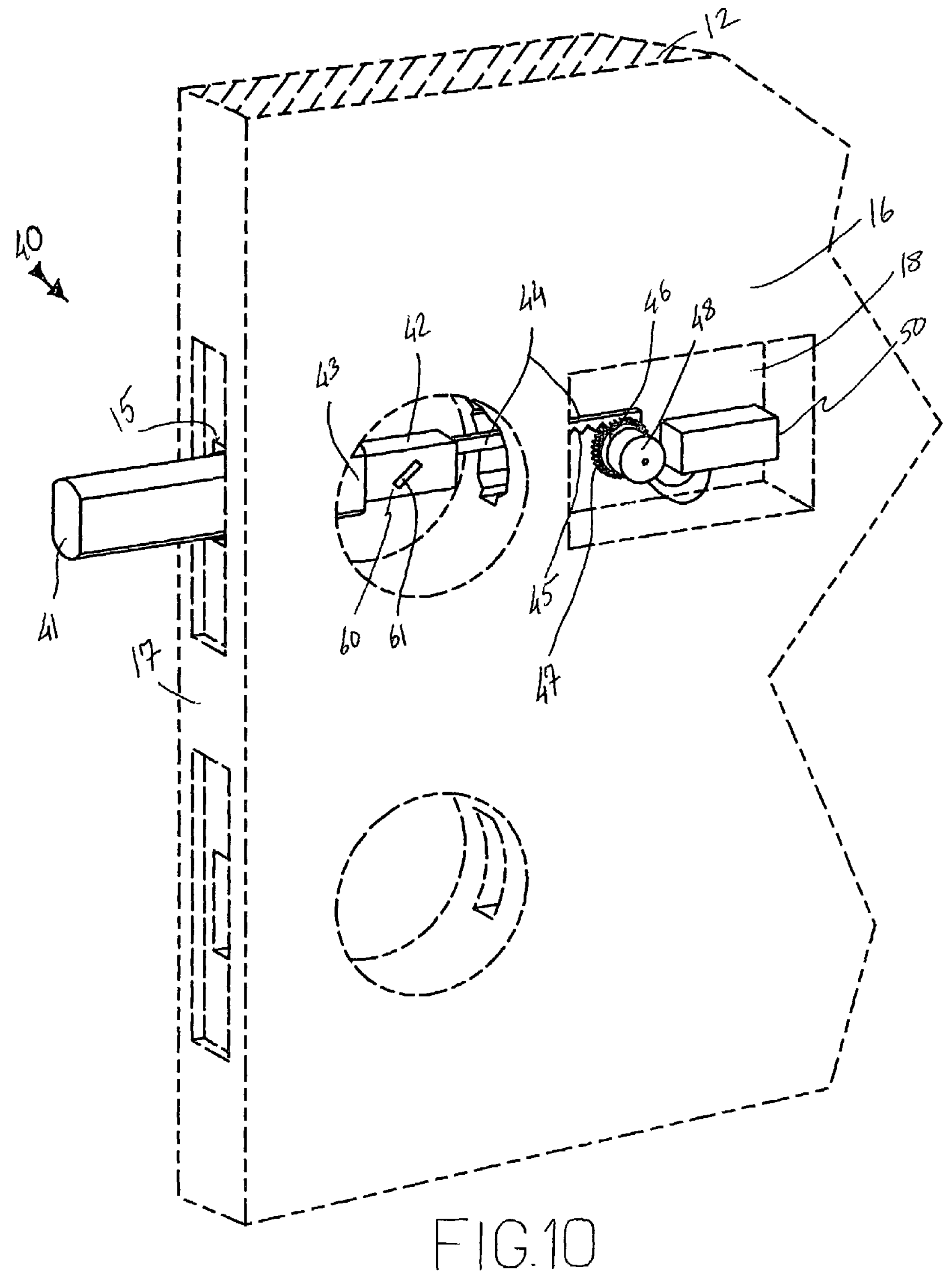
FIG. 10 is a perspective view of the bolt shown in FIG. 9, showing the automatic extending and retracting mechanism attached thereto.
Figure 11:
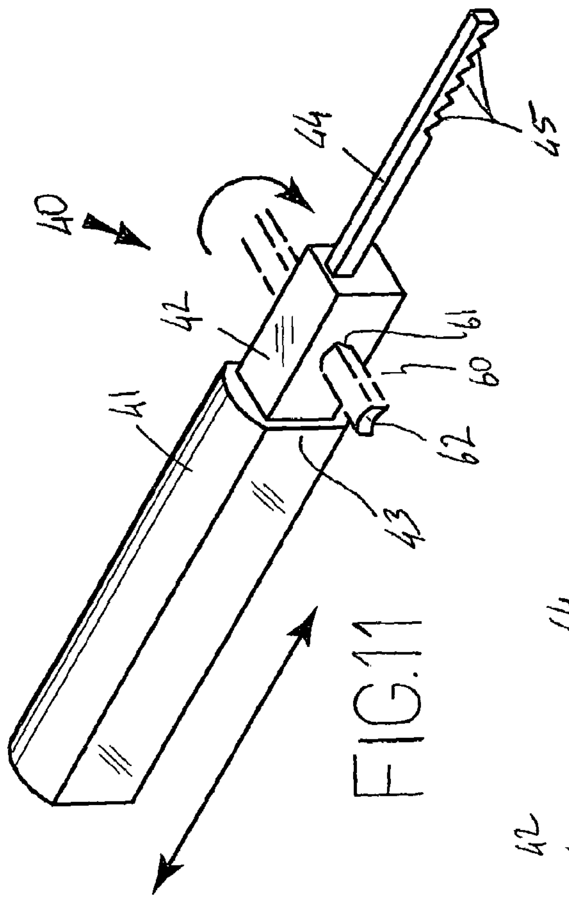
FIG. 11 is a perspective view of the elongated and rectilinear bolt shown in FIG. 9.
Figure 14:
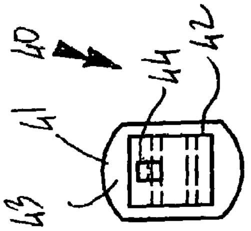
FIG. 14 is a front-elevational view of the bolt shown in FIG. 11.
Figure 12:
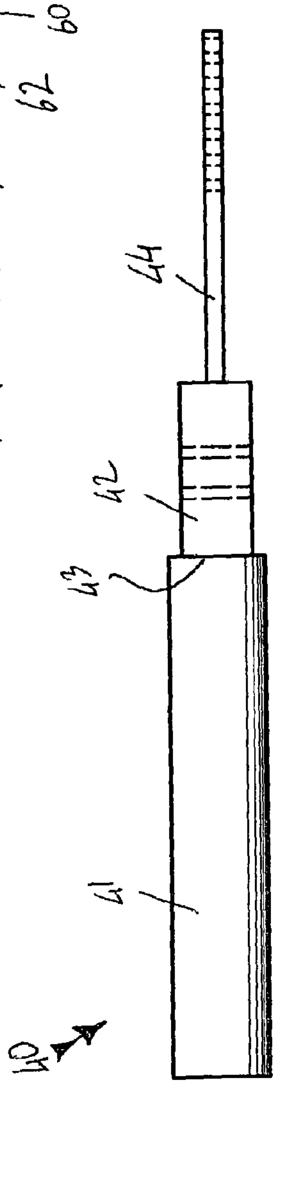
FIG. 12 is a top plan view of the bolt shown in FIG. 11.
Figure 13:
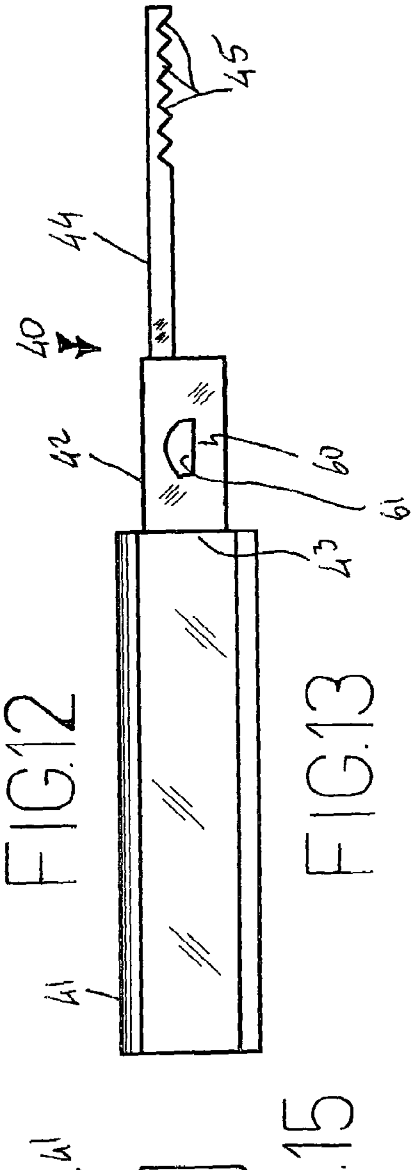
FIG. 13 is a side-elevational view of the bolt shown in FIG. 11.
Figure 15:
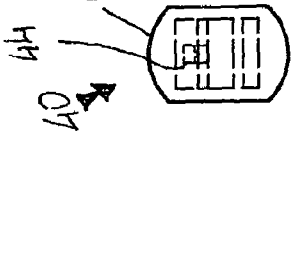
FIG. 15 is a rear-elevational view of the bolt shown in FIG. 11.
Figure 16:
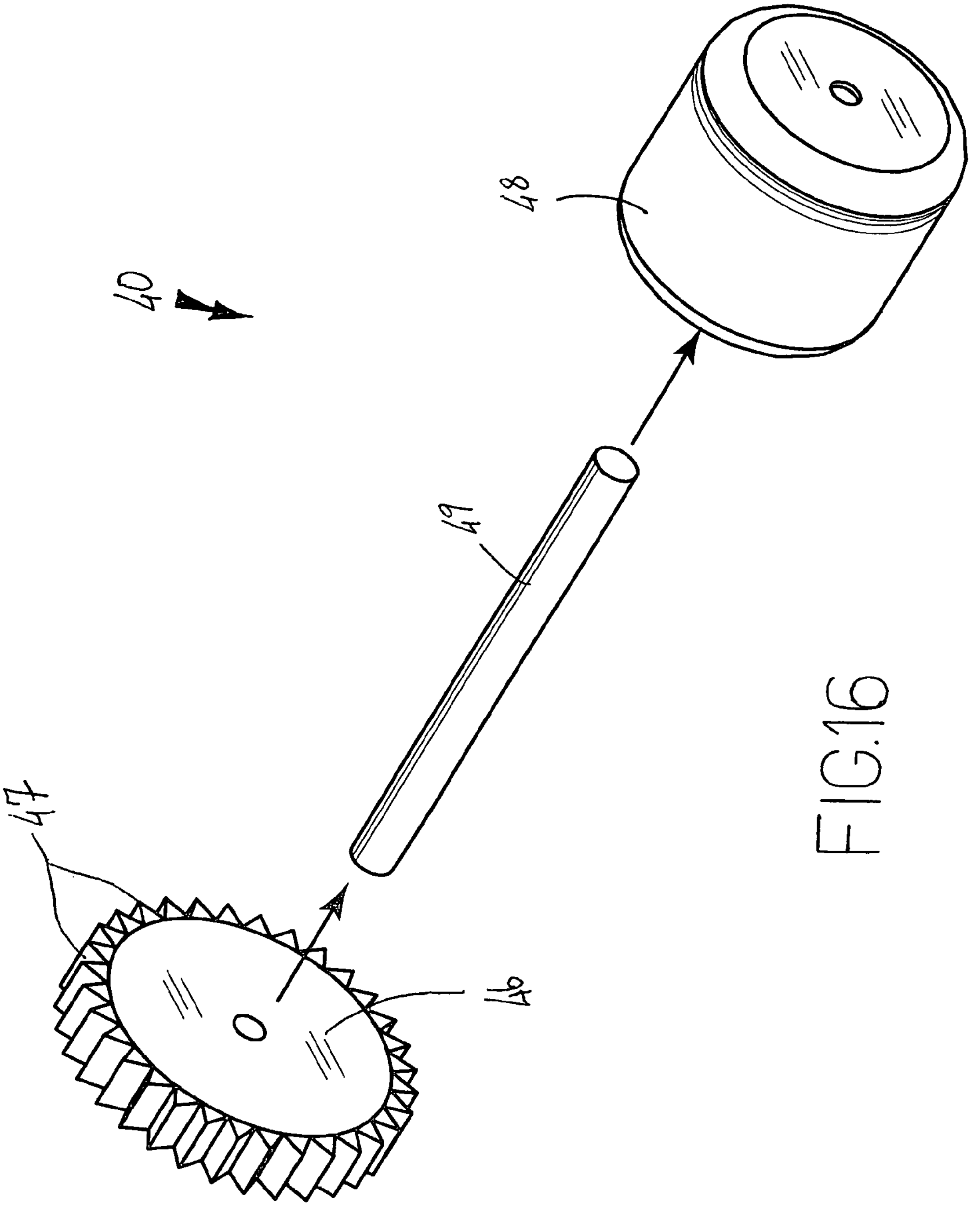
FIG. 16 is an exploded perspective view of the automatic extending and retracting mechanism shown in FIG. 10.
Figure 17:
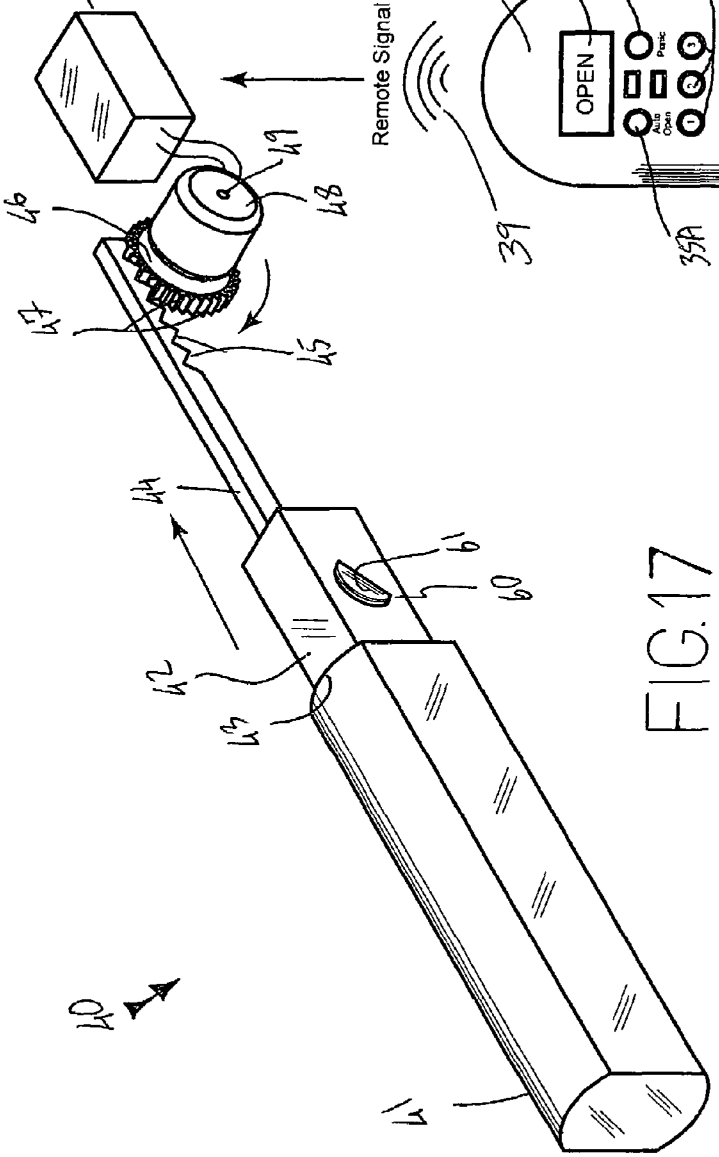
FIG. 17 is an enlarged perspective view of the elongated and rectilinear bolt and the automatic extending and retracting mechanism shown in FIG. 10.
Figure 18:
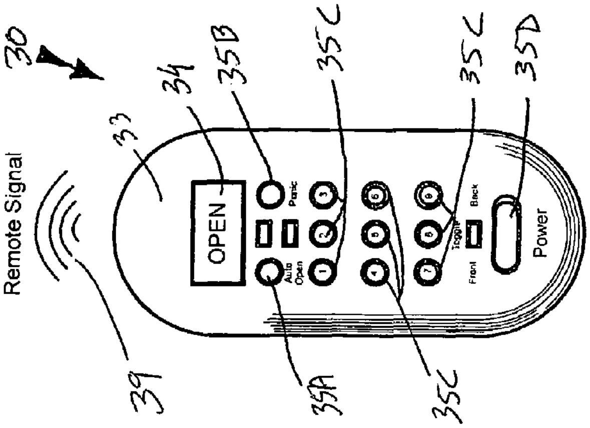
FIG. 18 is a top plan view of the portable controller shown in FIG. 1, showing the portable controllers during operating conditions.

Referring to FIGS. 1, and 9, a security panel 70 is directly affixed, without the use of intervening elements, to one side 16A of the door 12. Such a panel 70 is essential and advantageous for covering one of the door cavities 18 and effectively prohibiting unauthorized access thereto, thus preventing unauthorized persons from tampering with the system 10. The security panel 70 is provided with a plurality of coextensively shaped annular openings 71 that are important for advantageously allowing a door handle 19A and a deadbolt housing 19B to be operably connected directly, without the use of intervening elements, to the door 12 while conveniently maintaining the automatic extending and retracting mechanism 40 hidden from the environment.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A door lock interface system for allowing a user to remotely lock and unlock a door having a pair of cavities, said door lock interface system comprising:

a stationary controller, wherein said stationary controller is mounted to a support surface interior of a building that houses the door;

a portable controller in wireless communication with said stationary controller;

an elongated and rectilinear bolt positioned through a slot of a door, said bolt being spaced from said stationary and portable controllers;

means for automatically retracting and extending said bolt along a parallel and horizontal path such that said bolt becomes adapted between disengaged and engaged positions when unlocking and locking the door;

means for bypassing said automatic retracting and extending means such that the user can manually retract and extend said bolt when unlocking and locking the door respectively; and a security panel directly affixed to one side of the door, said panel covering one of the door cavities and prohibiting unauthorized access thereto.

2. The system of claim 1, wherein said automatic retracting and extending means comprises:

a stop member directly conjoined to an interior distal end of said bolt and seated between opposed faces of the door;

an elongated and rectilinear rod statically conjoined directly to said stop member and extending horizontally inwardly away from a jam side of the door, said rod having a serrated distal end oppositely facing said bolt and wherein said serrated distal end faces downwardly;

a drive gear having a toothed outer surface interlocked with said serrated distal end such that said rod linearly travels along the horizontal path when said drive gear rotates clockwise and counterclockwise respectively; and an electric motor and a drive shaft directly conjoined thereto, said drive shaft being directly coupled to said drive gear and being responsive to said stationary and portable controllers respectively for causing said drive gear to rotate in the clockwise and counter clockwise directions.

3. The system of claim 2, wherein said automatic extending and retracting means further comprises:

an internal controller electrically coupled to said motor;

a coded input signal generated and transmitted by said portable controller based upon a user input; and a coded output signal generated and transmitted by said stationary controller based upon instructions received from said coded input signal, said coded output signal being wirelessly transmitted to said internal controller for instructing said electric motor to rotate in the clockwise and counter clockwise directions during operating conditions.

4. The system of claim 2, wherein said bypassing means comprises:

a keyed slot formed directly through said stop member; and a key being associated with said keyed slot such that a user can manually extend and retract said shaft about said drive gear to thereby cause said bolt to extend and retract along the horizontal path and adapt the door between locked and unlocked positions.

5. The system of claim 3, wherein each of said portable controller and said stationary controller and said internal controller comprise:

a transceiver;

an analog to digital converter;

a processor; and a memory including software instructions that cause said portable controller and said stationary controller and said internal controller to decode said coded input and output signals respectively for verifying an authorized user, said software instructions including the steps of:

a. detecting an identification data stream embedded within said coded input and output signals, b. comparing said identification data stream with an authorization data stream, and c. instructing said portable controller and said stationary controller and said internal controller to perform predetermined tasks associated with verified and unverified identification data streams, one of said predetermined tasks emitting audible and visual alert signals when said identification data stream is unverified.

6. The system of claim 1, wherein said portable controller further comprises:

a base station electrically coupled to an external power source, said base station including a first charging bay for receiving said portable controller thereon; and a second charging bay for receiving a plurality of rechargeable batteries.

7. A door lock interface system for allowing a user to remotely lock and unlock a door having a pair of cavities, said door lock interface system comprising:

a stationary controller, wherein said stationary controller is mounted to a support surface interior of a building that houses the door;

a portable controller in wireless communication with said stationary controller;

an elongated and rectilinear bolt positioned through a slot of a door, said bolt being spaced from said stationary and portable controllers;

means for automatically retracting and extending said bolt along a parallel and horizontal path such that said bolt becomes adapted between disengaged and engaged positions when unlocking and locking the door;

means for bypassing said automatic retracting and extending means such that the user can manually retract and extend said bolt when unlocking and locking the door respectively; and a security panel directly affixed to one side of the door, said panel covering one of the door cavities and prohibiting unauthorized access thereto, wherein said security panel is provided with a plurality of coextensively shaped annular openings for allowing a door handle and a deadbolt housing to be operably connected directly to the door while maintaining said automatic extending and retracting means hidden from the environment.

8. The system of claim 7, wherein said automatic retracting and extending means comprises:

a stop member directly conjoined to an interior distal end of said bolt and seated between opposed faces of the door;

an elongated and rectilinear rod statically conjoined directly to said stop member and extending horizontally inwardly away from a jam side of the door, said rod having a serrated distal end oppositely facing said bolt and wherein said serrated distal end faces downwardly;

a drive gear having a toothed outer surface interlocked with said serrated distal end such that said rod linearly travels along the horizontal path when said drive gear rotates clockwise and counterclockwise respectively; and an electric motor and a drive shaft directly conjoined thereto, said drive shaft being directly coupled to said drive gear and being responsive to said stationary and portable controllers respectively for causing said drive gear to rotate in the clockwise and counter clockwise directions.

9. The system of claim 8, wherein said automatic extending and retracting means further comprises:

an internal controller electrically coupled to said motor;

a coded input signal generated and transmitted by said portable controller based upon a user input; and a coded output signal generated and transmitted by said stationary controller based upon instructions received from said coded input signal, said coded output signal being wirelessly transmitted to said internal controller for instructing said electric motor to rotate in the clockwise and counter clockwise directions during operating conditions.

10. The system of claim 8, wherein said bypassing means comprises:

a keyed slot formed directly through said stop member; and a key being associated with said keyed slot such that a user can manually extend and retract said shaft about said drive gear to thereby cause said bolt to extend and retract along the horizontal path and adapt the door between locked and unlocked positions.

11. The system of claim 9, wherein each of said portable controller and said stationary controller and said internal controller comprise:

a transceiver;

an analog to digital converter;

a processor; and a memory including software instructions that cause said portable controller and said stationary controller and said internal controller to decode said coded input and output signals respectively for verifying an authorized user, said software instructions including the steps of:

a. detecting an identification data stream embedded within said coded input and output signals, b. comparing said identification data stream with an authorization data stream, and c. instructing said portable controller and said stationary controller and said internal controller to perform predetermined tasks associated with verified and unverified identification data streams, one of said predetermined tasks emitting audible and visual alert signals when said identification data stream is unverified.

12. The system of claim 7, wherein said portable controller further comprises:

a base station electrically coupled to an external power source, said base station including a first charging bay for receiving said portable controller thereon; and a second charging bay for receiving a plurality of rechargeable batteries.

13. A door lock interface system for allowing a user to remotely lock and unlock a door having a pair of cavities, said door lock interface system comprising:

a stationary controller, wherein said stationary controller is mounted to a support surface interior of a building that houses the door;

a portable controller in wireless communication with said stationary controller;

an elongated and rectilinear bolt positioned through a slot of a door, said bolt being spaced from said stationary and portable controllers;

means for automatically retracting and extending said bolt along a parallel and horizontal path such that said bolt becomes adapted between disengaged and engaged positions when unlocking and locking the door;

means for bypassing said automatic retracting and extending means such that the user can manually retract and extend said bolt when unlocking and locking the door respectively; and a security panel directly affixed to one side of the door, said panel covering one of the door cavities and prohibiting unauthorized access thereto, wherein said security panel is provided with a plurality of coextensively shaped annular openings for allowing a door handle and a deadbolt housing to be operably connected directly to the door while maintaining said automatic extending and retracting means hidden from the environment;

wherein said automatic retracting and extending means comprises:

a stop member directly conjoined to an interior distal end of said bolt and seated between opposed faces of the door;

an elongated and rectilinear rod statically conjoined directly to said stop member and extending horizontally inwardly away from a jam side of the door, said rod having a serrated distal end oppositely facing said bolt and wherein said serrated distal end faces downwardly;

a drive gear having a toothed outer surface interlocked with said serrated distal end such that said rod linearly travels along the horizontal path when said drive gear rotates clockwise and counterclockwise respectively; and an electric motor and a drive shaft directly conjoined thereto, said drive shaft being directly coupled to said drive gear and being responsive to said stationary and portable controllers respectively for causing said drive gear to rotate in the clockwise and counter clockwise directions;

wherein said rod remains coaxially oriented with said bolt while linearly traveling along the horizontal path.

14. The system of claim 13, wherein said automatic extending and retracting means further comprises:

an internal controller electrically coupled to said motor;

a coded input signal generated and transmitted by said portable controller based upon a user input; and a coded output signal generated and transmitted by said stationary controller based upon instructions received from said coded input signal, said coded output signal being wirelessly transmitted to said internal controller for instructing said electric motor to rotate in the clockwise and counter clockwise directions during operating conditions.

15. The system of claim 13 wherein said bypassing means comprises:

a keyed slot formed directly through said stop member; and a key being associated with said keyed slot such that a user can manually extend and retract said shaft about said drive gear to thereby cause said bolt to extend and retract along the horizontal path and adapt the door between locked and unlocked positions.

16. The system of claim 14, wherein each of said portable controller and said stationary controller and said internal controller comprise:

a transceiver;

an analog to digital converter;

a processor; and a memory including software instructions that cause said portable controller and said stationary controller and said internal controller to decode said coded input and output signals respectively for verifying an authorized user, said software instructions including the steps of:

a. detecting an identification data stream embedded within said coded input and output signals, b. comparing said identification data stream with an authorization data stream, and c. instructing said portable controller and said stationary controller and said internal controller to perform predetermined tasks associated with verified and unverified identification data streams, one of said predetermined tasks emitting audible and visual alert signals when said identification data stream is unverified.

17. The system of claim 13, wherein said portable controller further comprises:

a base station electrically coupled to an external power source, said base station including a first charging bay for receiving said portable controller thereon; and a second charging bay for receiving a plurality of rechargeable batteries.

* * * * *